(12) United States Patent
Ohtomo et al.

(10) Patent No.: US 7,301,617 B2
(45) Date of Patent: Nov. 27, 2007

(54) SURVEYING APPARATUS

(75) Inventors: Fumio Ohtomo, Tokyo (JP); Kaoru Kumagai, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 206 days.

(21) Appl. No.: 11/137,306

(22) Filed: May 25, 2005

(65) Prior Publication Data

US 2005/0275830 A1    Dec. 15, 2005

(30) Foreign Application Priority Data

Jun. 9, 2004  (JP)  ............................. 2004-171028

(51) Int. Cl.
*G01B 11/26* (2006.01)
(52) U.S. Cl. .................................. 356/152.3
(58) Field of Classification Search ............. 356/152.3
See application file for complete search history.

(56) References Cited

U.S. PATENT DOCUMENTS 6,836,285 B1 * 12/2004 Lubard et al. ............... 348/31

FOREIGN PATENT DOCUMENTS

| DE | 19922321 A1 | 11/2000 |
|----|----|----|
| JP | 63-083604 | 4/1988 |
| JP | 5-322569 | 12/1993 |
| JP | P2000-275044 A | 10/2000 |
| JP | 2002-131054 | 5/2002 |
| WO | WO 99/60335 | 11/1999 |

* cited by examiner

*Primary Examiner*—Thomas H. Tarcza
*Assistant Examiner*—Luke D. Ratcliffe
(74) *Attorney, Agent, or Firm*—Chapman and Cutler LLP (57) ABSTRACT

A surveying apparatus including an objective lens; an irradiation unit for irradiating illumination light from the objective lens toward a reflector; a ranging unit for irradiating ranging light from the objective lens to measure a distance from the surveying apparatus to the reflector; an image sensor for outputting information on an image in a field of view based on light entering through the objective lens; an image processing circuit connected with the image sensor for processing the image information outputted from the image sensor; and a monitor connected with the image processing circuit for displaying an image, wherein a ranging-possible area and a position at which the reflector is located based on the illumination light reflected from the reflector are displayed in a form of figure on the image displayed on the monitor.

21 Claims, 5 Drawing Sheets

SURVEYING APPARATUS

BACKGROUND OF THE INVENTION

1. Field of the Invention

The present invention relates to a surveying apparatus which irradiates illumination light such as an infrared ray or measurement light toward a reflector to carry out ranging and/or measurement of angle relative to the reflector on the basis of the illumination light reflected by the reflector.

2. Description of the Related Art

Heretofore, there has been known a surveying apparatus having an irradiation unit provided with an objective lens for irradiating an infrared ray toward a reflector and a collimation optical system unit for observing a field of view based on visible light entering through the objective lens constructing a part of a telescope, in which the collimation optical system unit is provided with a Porro prism for converting an image within the field of view which is based on a visible light flux obtained through the objective lens into an erected non-reverse image and an ocular lens part for observing the erected non-reverse image obtained through the Porro prism (for reference, see JP-A H05-322569).

In addition, there has been also known a surveying apparatus wherein an ocular lens part of a collimation optical system unit is attached with a CCD (Charge-Coupled Device) camera as an image sensor (for reference, see JP-A 2000-275044).

Moreover, there has been known a surveying apparatus capable of obtaining three-dimensional coordinates in a short time with high accuracy, by detecting presence of an object to be measured by using a camera and detecting two-dimensional coordinates of an actual size of the object on an imaging area of the camera, then measuring a distance to the object by using distance measuring means and calculating the three-dimensional coordinates of the object based on the detected two-dimensional coordinates and the distance to the object (for example, see JP-A S63-083604).

In the conventional surveying apparatus, there is a problem that a worker has to be skilled in order to find out the reflector from the background in the field of view when looking the reflector through the ocular lens.

SUMMARY OF THE INVENTION

Therefore, at least one objective of the present invention is to provide a surveying apparatus which is easy to find a reflector from the background in a field of view and capable of accessing the reflector quickly without requiring skill.

To achieve these and other advantages and in accordance with the purpose of the invention, as embodied and broadly described herein, the invention provides a surveying apparatus. The surveying apparatus of the present invention comprises: an objective lens; an irradiation unit for irradiating illumination light from the objective lens toward a reflector; a ranging unit for irradiating ranging light from the objective lens to measure a distance from the surveying apparatus to the reflector; an image sensor for outputting information on an image in a field of view based on light entering through the objective lens; an image processing circuit connected with the image sensor for processing the image information outputted from the image sensor; and a monitor connected with the image processing circuit for displaying an image, wherein a ranging-possible area and a position of the reflector determined based on the illumination light reflected from the reflector are displayed in a form of figure on the image displayed on the monitor.

According to the present invention, it exhibits an advantageous effect that it is easy to find the reflector from the background in the field of view and capable of accessing the reflector quickly without requiring skill.

Following are preferred embodiments (1) to (8) of the surveying apparatus according to the present invention. Any combinations thereof are considered to be preferred ones of the present invention unless any contradictions occur.

(1) The surveying apparatus further comprises: a collimation optical system unit for observing the field of view based on visible light entering through the objective lens; an erected non-reverse image converting optical device for converting the image in the field of view based on the light entering through the objective lens into an erected non-reverse image; and an ocular lens part for observing the erected non-reverse image obtained through the erected non-reverse image converting optical device, wherein the erected non-reverse image converting optical device has an optical path splitting surface for splitting an incident light flux comprising the visible light and the illumination light which is reflected by the reflector and obtained through the objective lens, into a light flux that goes toward the ocular lens part and a light flux that goes toward the image sensor provided in a direction to which the incident light flux travels.

According to the embodiment (1), it exhibits advantageous effects that it is easy to find the reflector from the background in the field of view and capable of accessing the reflector quickly without requiring skill, and it is possible to quickly recognize whether or not the reflector exists in the ranging-possible area.

(2) The surveying apparatus further comprises a positioning unit for measuring an angle of elevation and a horizontal angle of the reflector, wherein the image processing circuit displays a positioning-possible area on a screen of the monitor.

According to the embodiment (2), it exhibits advantageous effects that it is easy to find the reflector from the background in the field of view and capable of accessing the reflector quickly without requiring skill, and it is possible to quickly recognize whether or not the reflector exists in the positioning-possible area.

(3) The image processing circuit outputs command signals for setting the positioning unit as a positioning mode when the reflector is in the positioning-possible area and command signals for setting the ranging unit as a ranging mode when the reflector is in the ranging-possible area.

According to the embodiment (3), it exhibits advantageous effects that it is easy to find the reflector from the background in the field of view and capable of accessing the reflector quickly without requiring skill, and it is possible to automatically measure the angle of elevation and the horizontal angle when the reflector is in the positioning-possible area.

(4) The image processing circuit displays three-dimensional coordinate positions of the reflector on the screen of the monitor when the reflector is in the ranging-possible area.

According to the embodiment (4), it exhibits advantageous effects that it is easy to find the reflector from the background in the field of view and capable of accessing the reflector quickly without requiring skill, and it is possible to measure the distance from the surveying apparatus to the reflector.

(5) When the positioning mode and/or the ranging mode are/is in operation, warning indicating that the positioning mode and/or the ranging mode are/is in operation is displayed on the screen of the monitor.

(6) The reflector is displayed on the screen of the monitor by at least one of blinking, highlighting utilizing color and/or brightness, and use of a character.

(7) A direction of movement of an axis of collimation is displayed by an arrow on the screen of the monitor.

(8) The position at which the reflector exists is announced by a sound or voice.

According to the embodiments (5) to (8), they exhibit the advantageous effect that it is easy to find the reflector from the background in the field of view and capable of accessing the reflector quickly without requiring skill.

It is to be understood that both the foregoing general description and the following detailed description are exemplary, and are intended to provide further explanation of the invention as claimed.

The disclosure of Japanese Patent Application No. 2004-171028, filed on Jun. 9, 2004, including specification, drawings and claims is incorporated herein by reference in its entirety.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5A to 5C are explanatory diagrams showing examples of how images are displayed according to the surveying apparatus of the present invention, in which

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

Figure 1:
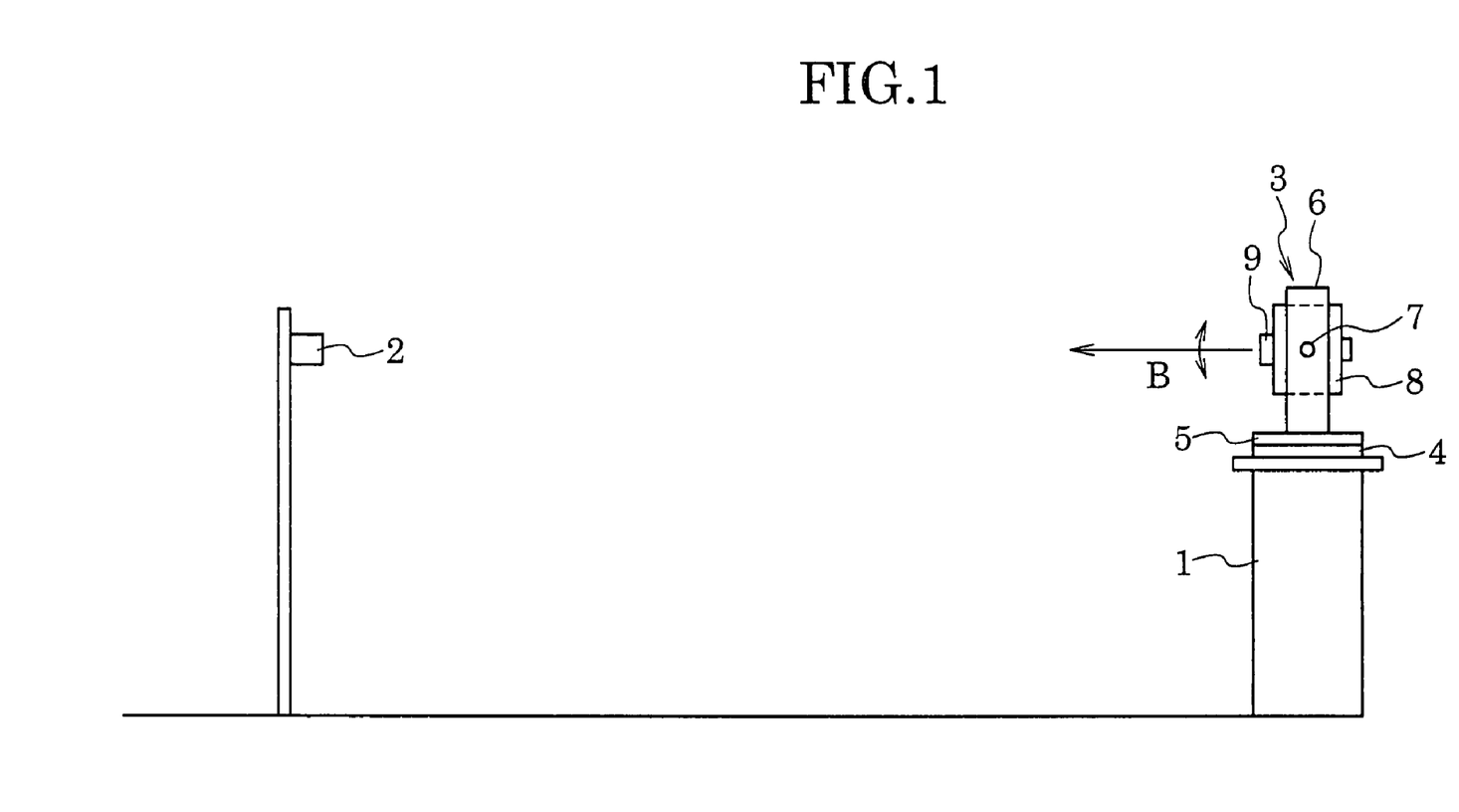
FIG. 1 is a side view showing a state that a surveying apparatus according to the present invention is installed.

Referring to FIG. 1, a reference numeral 1 denotes a surveying base and a reference numeral 2 denotes a corner cube (prism) as a reflector installed at a survey point. The surveying base 1 is provided with a surveying apparatus 3. The surveying apparatus 3 has a fixed base 4 and a horizontally rotating portion 5. The fixed base 4 is provided with a well-known rotating mechanism (not shown) for rotating the horizontally rotating portion 5.

Figure 2:
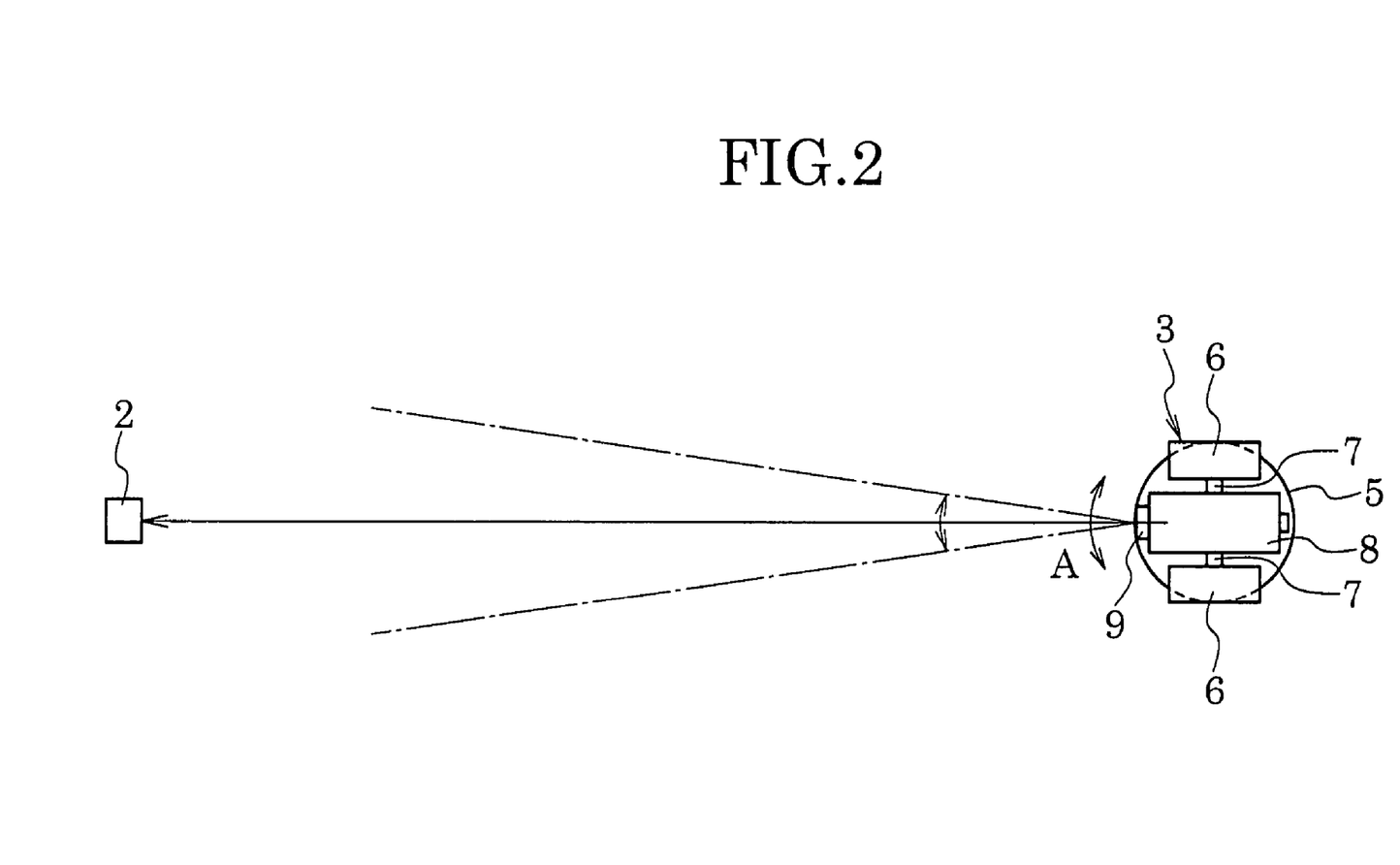
FIG. 2 is a plan view showing the state that the surveying apparatus according to the present invention is installed.

As shown in FIG. 2, the horizontally rotating portion 5 is rotated in a direction of arrow A relative to the fixed base 4. The horizontally rotating portion 5 has a supporting portion (support stand) 6. The supporting portion 6 is provided with a vertical direction revolving shaft 7. A well-known rotating mechanism (not shown) for rotating the vertical direction revolving shaft 7 is provided inside of the supporting portion 6. The vertical direction revolving shaft 7 is provided with a surveying apparatus telescope section 8. The surveying apparatus telescope section 8 is rotated in a horizontal direction by the rotation of the horizontally rotating portion 5, and is also rotated in a vertical direction as shown by an arrow B in FIG. 1 by the rotation of the vertical direction revolving shaft 7.

Figure 3:
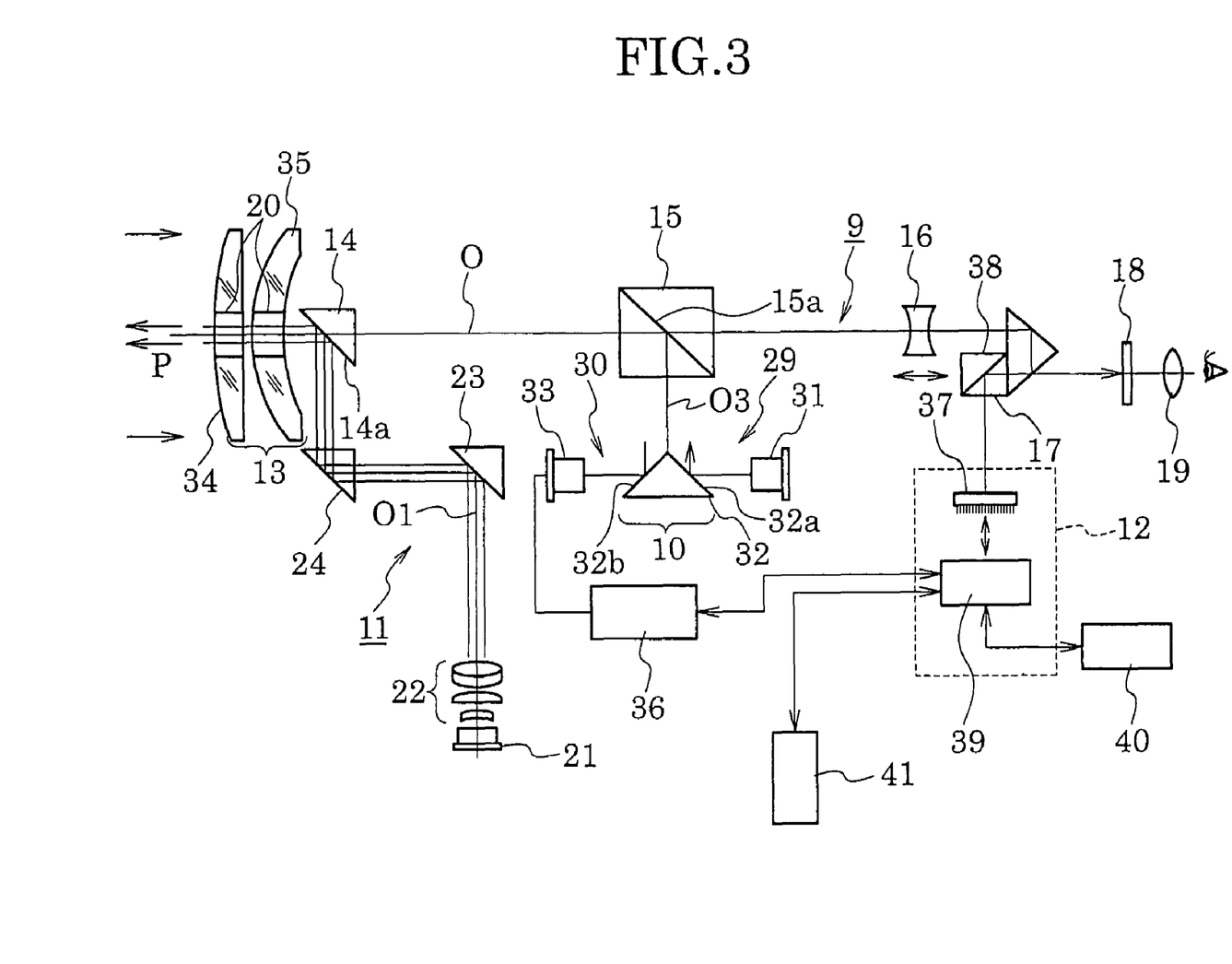
FIG. 3 is an explanatory diagram showing an optical section of the surveying apparatus according to the present invention.

As shown in FIG. 3, the surveying apparatus telescope section 8 comprises a collimation optical system unit 9, a ranging optical unit (ranging unit) 10, an irradiation unit 11 and a light-receiving unit 12. The collimation optical system unit 9 is for collimating the corner cube 2. The collimation optical system unit 9 comprises an objective lens 13, an optical path synthesizing prism 14, an optical path splitting prism 15, a focusing lens 16, a Porro prism (erected non-reverse image converting optical device) 17, a focus mirror 18, and an ocular lens 19 as an ocular lens part, to construct a telescope.

The objective lens 13 has a penetrated section 20. The optical path synthesizing prism 14 constructs a part of the irradiation unit 11. The irradiation unit 11 comprises a laser diode 21, a collimator lens 22 and reflection prisms 23 and 24. The laser diode 21 projects an infrared laser beam P as measurement light (illumination light) having a wavelength of, for example but not limited to, 800 nanometers. The collimator lens 22 condenses the projected infrared laser beam P to an extent that an angle of range of irradiation of the infrared laser beam P emitted from the objective lens 13 corresponds with a viewing angle.

Figure 4:
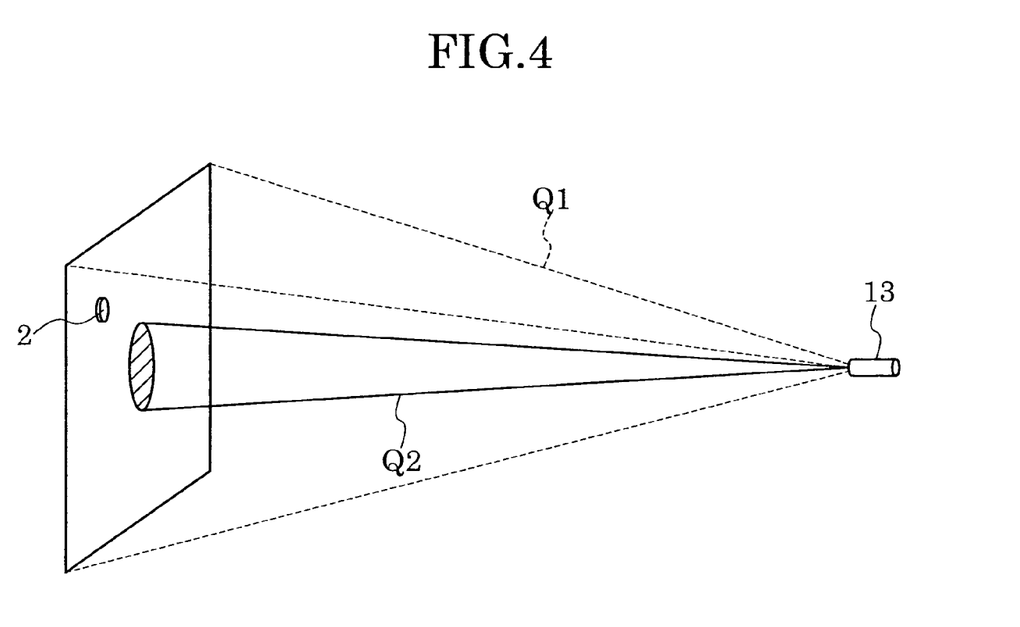
FIG. 4 is a diagram showing one example of a range of irradiation of an infrared ray and ranging light irradiated from an irradiation unit according to the present invention.

The optical path synthesizing prism 14 is for matching an optical axis O1 of the irradiation unit 11 with a collimation optical axis O of the objective lens 13. The optical path synthesizing prism 14 has a reflective surface 14a. The infrared laser beam P projected from the laser diode 21 is reflected by the reflection prisms 23 and 24, the reflected infrared laser beam P is then guided toward the objective lens 13, and the infrared laser beam P is thereafter emitted externally through the penetrated section 20 of the objective lens 13 to be irradiated toward the corner cube 2. FIG. 4 shows a range of irradiation Q1 of the infrared laser beam P. The range of irradiation Q1 corresponds to a positioning-possible area in which a horizontal angle and an angle of elevation of the corner cube 2 are detectable. An angle of the positioning-possible area is, for example but not limited to, approximately 1° to 1.5° (approximately 1 degree to 1.5 degrees) in terms of the viewing angle.

The infrared laser beam P corresponding to the positioning-possible area is captured by an image sensor 37 such as CCD and CMOS (Complementary Metal-Oxide Semiconductor) connected with an image processing circuit 39 which will be described later. The image sensor 37 outputs image signals as image information based on a result of light-receiving. Pixels of the image sensor structuring an image plane of the image sensor 37 correspond to the horizontal angle and the angle of elevation of the corner cube 2 from the center of its image plane. Accordingly, it is possible to calculate the horizontal angle and the angle of elevation of the corner cube 2 from positions of the pixels on the image plane of the image sensor 37 which have received the infrared laser beam P which corresponds to the positioning-possible area.

The infrared laser beam P reflected from the corner cube 2 is collected by the objective lens 13 at its whole region and is then guided to the optical path splitting prism 15. The optical path splitting prism 15 has a reflective surface 15a.

The ranging optical unit 10 comprises a light-projecting system 29 and a light-receiving system 30. The light-projecting system 29 has a laser source 31, and the light-receiving system 30 has a light-sensitive element 33. A triangular prism 32 is disposed between the light-projecting system 29 and the light-receiving system 30. The laser source 31 projects an infrared laser lightwave as a ranging light flux (measurement light, ranging light). A wavelength of the infrared laser lightwave is, for example but not limited to, 900 nanometers, which is different from the wavelength of the infrared laser beam P.

The infrared laser lightwave projected from the laser source 31 is reflected by a reflective surface 32a of the triangular prism 32, and the reflected infrared laser lightwave is then guided to the reflective surface 15a of the optical path splitting prism 15. The reflective surface 15a allows light having a wavelength of less than 900 nanometers for example to transmit therethrough, and reflects light of infrared region including light having a wavelength of 900 nanometers for example.

The infrared laser lightwave guided to and reflected by the reflective surface 15a passes a lower half region 34 of the objective lens 13 and is emitted externally of the surveying apparatus telescope section 8 as a plane wave. As shown in FIG. 4, a range of irradiation Q2 of the emitted infrared laser lightwave is narrower than the range of irradiation Q1, and the range of irradiation Q2 corresponds to a ranging-possible area in which ranging of a distance from the surveying apparatus 3 to the corner cube 2 is possible. An angle of the ranging-possible area is, for example but not limited to, approximately 8' (approximately 8 arc-minutes) in terms of the viewing angle.

The emitted infrared laser lightwave is reflected by the corner cube 2. The infrared laser lightwave reflected by the corner cube 2 returns to the objective lens 13 and is collected by an upper half region 35 of the objective lens 13. The collected infrared laser lightwave is guided to the reflective surface 15a of the optical path splitting prism 15 and is then reflected toward a reflective surface 32b of the triangular prism 32 by the reflective surface 15a. Thereafter, the infrared laser lightwave is reflected by the reflective surface 32b and is converged on the light-sensitive element 33.

The light-sensitive element 33 output signals which are based on the received infrared laser lightwave upon receiving of the infrared laser lightwave and the signals are inputted to a measuring circuit 36 as a well-known arithmetic means. The measuring circuit 36 calculates the distance from the surveying apparatus telescope section 8 to the corner cube 2, and thereby the distance from the surveying apparatus to the corner cube 2 is measured.

A light flux having the wavelength of less than 900 nanometers for example is guided to the Porro prism 17 through the optical path splitting prism 15 and the focusing lens 16. The Porro prism 17 functions to convert an image in a field of view which is based on a visible light flux obtained through the objective lens 13 into an erected non-reverse image.

The Porro prism 17 has an optical path splitting surface 38. The optical path splitting surface 38 splits an incident light flux comprising visible light and infrared light which has the wavelength of less than 900 nanometers for example and which is reflected by the corner cube 2 and obtained through the objective lens 13, into a light flux that goes toward the focus mirror 18 constructing a part of an ocular lens system and a light flux that goes toward the light-receiving unit 12 provided in a direction to which the incident light flux travels.

The light flux that goes toward the focus mirror 18 is imaged on the focus mirror 18. A worker is possible to collimate the corner cube 2 by observing a visible image imaged on the focus mirror 18 through the ocular lens 19.

The light-receiving unit 12 is provided with an image pickup device such as CCD and CMOS as the aforementioned image sensor 37. The image sensor 37 is connected with the image processing circuit 39. The image processing circuit 39 processes the image information outputted from the image sensor 37. The image processing circuit 39 is connected with a monitor 40 for displaying an image.

The surveying apparatus 3 is provided with a positioning unit 41 for measuring the horizontal angle and the angle of elevation of the corner cube 2 in conjunction with the ranging optical unit 10. Since a structure of the positioning unit 41 is well-known, the positioning unit 41 will not be explained in detail.

The image processing circuit 39 comprises processing means. The processing means carries out a process for displaying a position of the corner cube 2 relative to the collimation optical axis O on a screen 40A of the monitor 40, in such a manner that the worker is possible to recognize the position of the corner cube 2 relative to the collimation optical axis O on the screen 40A.

Figure 5A:
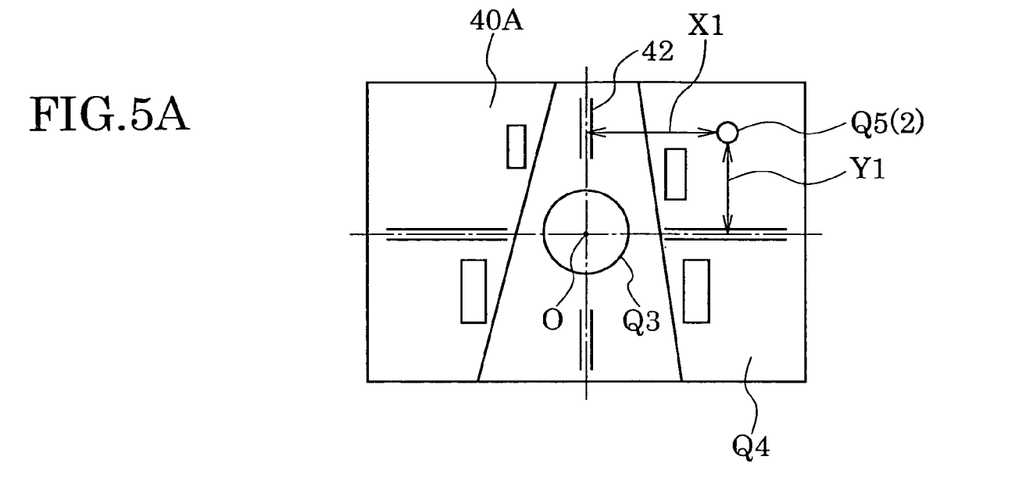
FIG. 5A is an explanatory diagram showing a state that a corner cube is in a positioning-possible area.

As shown in FIG. 5A, a pattern Q3 as the ranging-possible area is displayed in a form of figure in the center of the screen 40A of the monitor 40 and also the positioning-possible area Q4 which displays the angle of elevation and the horizontal angle is displayed on the screen 40A by the processing means. In addition, a cross-shaped pattern 42 as reference positions for the horizontal angle and the angle of elevation is displayed on the screen 40A by the processing means. The position at which the corner cube 2 exists is displayed as a mark Q5 on the screen 40A by the processing means together with a background image.

Therefore, the worker is possible to recognize quickly whether or not the corner cube 2 is at the pattern Q3 by checking a position in a horizontal direction and a position in a vertical direction of the mark Q5. Hence, the worker is possible to rotate the collimation optical system unit 9 toward the ranging-possible area, quickly.

In one embodiment, the mark Q5 may be displayed by blinking, or may be highlighted as the corner cube 2 by a certain color or certain brightness. In addition, the mark Q5 may be displayed on the screen by using a certain character (letter, number, alphabet or symbol, for example).

Figure 5B:
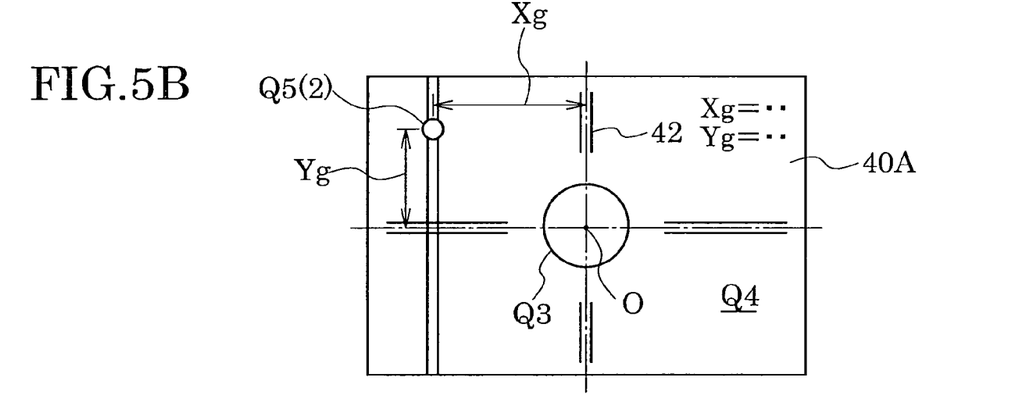
FIG. 5B is a diagram showing a state that the corner cube is in the positioning-possible area as well as an automatic positioning mode is set to find an angle of elevation and a horizontal angle by calculation and that the calculated angle of elevation and the horizontal angle are displayed.

Such a structure may be employed in which command signals are outputted from the image processing circuit 39 to the positioning unit 41 to set the positioning unit 41 to be in an automatic positioning-possible mode when the mark Q5 of the corner cube 2 is in the positioning-possible area Q4 as shown in FIG. 5B, so as to measure a horizontal angle Xg and an angle of elevation Yg automatically and display the measured horizontal angle Xg and the angle of elevation Yg on the screen 40A.

Moreover, since it is possible to read a horizontal angle X1 and an angle of elevation Y1 according to the position of the mark Q5 relative to the pattern 42, it is also possible to correct the horizontal angle and the angle of elevation of the position of the pattern 42 and display a horizontal angle and an angle of elevation of a position at the center of the mark Q5 of the corner cube 2.

Figure 5C:
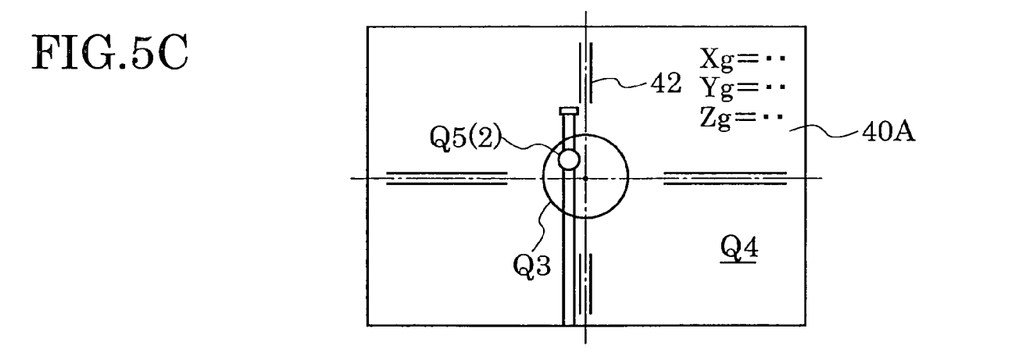
FIG. 5C is a diagram showing a state that the corner cube is in a ranging-possible area as well as the automatic positioning mode and an automatic ranging mode are set to find the angle of elevation, the horizontal angle and a distance by the calculation, and that the calculated angle of elevation, horizontal angle and distance are displayed.

As shown in FIG. 5C, when the mark Q5 of the corner cube 2 is in the pattern Q3 as the ranging-possible area, command signals may be outputted from the image processing circuit 39 to the positioning unit 41 and to the measuring circuit 36 to set the positioning unit 41 to be in the automatic positioning-possible mode and to set the measuring circuit 36 to be in an automatic ranging-possible mode, so as to measure the horizontal angle Xg, the angle of elevation Yg and a distance Zg from the surveying apparatus 3 to the corner cube 2 automatically and display the measured horizontal angle Xg, angle of elevation Yg and the distance Zg on the screen 40A automatically as three-dimensional coordinate positions Xg, Yg and Zg.

In addition, a direction of movement from one place to another for example of an axis of collimation may be displayed by an arrow on the screen, or a frequency of the blinking of the mark Q5 of the corner cube 2 may be changed to highlight the location of the corner cube 2.

The position at which the corner cube 2 exists may be announced to the worker by a sound or voice, or warning may be displayed on the screen to inform the worker that the automatic positioning-possible mode and/or the automatic ranging-possible mode are/is set.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A surveying apparatus, comprising:
   a collimation optical system unit including an objective lens for a user to observe a field a view therethrough;
   an irradiation unit configured to irradiate illumination light from said objective lens toward a reflector;
   a ranging unit configured to irradiate ranging light from said objective lens and configured to receive through the objective lens the ranging light reflected from the reflector to measure a distance from the surveying apparatus to said reflector;
   an image sensor configured to receive light entering through the objective lens and configured to output information on an image in the field of view based on the received light;
   a display; and
   an image processing circuit connected with said image sensor and the display and configured to display on the display the image of the field of view based on said image information outputted from said image sensor, a ranging-possible area in which ranging of the distance from the surveying apparatus to the reflector is possible by the ranging unit in a form of a figure, and a position of the reflector relative to a collimation optical axis of the collimation optical system unit in a form of a figure.

2. The surveying apparatus according to claim 1, further comprising:
   an erected non-reverse image converting optical device configured to convert the image in the field of view based on the light entering through said objective lens into an erected non-reverse image; and
   an ocular lens part for the user to observe said erected non-reverse image obtained through the erected non-reverse image converting optical device, wherein
   said erected non-reverse image converting optical device has an optical path splitting surface configured to split an incident light flux comprising said visible light and the illumination light which is reflected by said reflector and obtained through said objective lens, into a light flux that goes toward said ocular lens part and a light flux that goes toward said image sensor provided in a direction to which said incident light flux travels.

3. The surveying apparatus according to claim 1, further comprising a positioning unit configured to measure an angle of elevation and a horizontal angle of said reflector, wherein said image processing circuit is configured to display a positioning-possible area in which the angle of elevation and the horizontal angle of the reflector is detectable by the positioning unit on said display.

4. The surveying apparatus according to claim 3, wherein said image processing circuit is configured to output command signals for setting said positioning unit to a positioning mode when said reflector is in said positioning-possible area, and
   command signals for setting said ranging unit to a ranging mode when said reflector is in said ranging-possible area.

5. The surveying apparatus according to claim 4, wherein said image processing circuit is configured to display three-dimensional coordinate positions of said reflector on the display when said reflector is in said ranging-possible area.

6. The surveying apparatus according to claim 4, wherein when at least one of said positioning mode and said ranging mode is in operation, warning indicating that said at least one of said positioning mode and said ranging mode is in operation is displayed on the display.

7. The surveying apparatus according to claim 1, wherein said reflector is displayed on said display by at least one of blinking, highlighting utilizing color, highlighting utilizing brightness, and use of a character.

8. The surveying apparatus according to claim 1, wherein a direction of movement of an axis of collimation of the collimation optical system unit is displayed by an arrow on said display.

9. The surveying apparatus according to claim 1, wherein the position at which said reflector exists is announced by a sound or voice.

10. A surveying apparatus, comprising:
    a collimation optical system unit including an objective lens for a user to observe a field of view therethrough;
    a ranging unit configured to irradiate ranging light from the objective lens and configured to receive through the objective lens the ranging light reflected from a reflector to measure a distance from the surveying apparatus to the reflector;
    an image sensor configured to receive light entering through the objective lens and configured to output information on an image in the field of view based on the received light;
    a display; and
    an image processing circuit connected with the image sensor and the display and configured to display on the display the image of the field of view based on the image informatibn outputted from the image sensor, a ranging-possible area in which ranging of the distance from the surveying apparatus to the reflector is possible by the ranging unit in a form of a figure, and a position of the reflector relative to a collimation optical axis of the collimation optical system unit in a form of a figure.

11. The surveying apparatus according to claim 10, further comprising:
   an irradiation unit configured to irradiate illumination light from the objective lens toward the reflector;
   an erected non-reverse image converting optical device configured to convert the image in the field of view based on the light entering through the objective lens into an erected non-reverse image; and
   an ocular lens part for the user to observe the erected non-reverse image obtained through the erected non-reverse image converting optical device,
   wherein the erected non-reverse image converting optical device has an optical path splitting surface configured to split an incident light flux comprising the visible light and the illumination light which is reflected by the reflector and obtained through the objective lens, into a light flux that goes toward the ocular lens part and a light flux that goes toward the image sensor provided in a direction to which the incident light flux travels.

12. The surveying apparatus according to claim 11, further comprising:
   a positioning unit configured to measure an angle of elevation and a horizontal angle of the reflector from the illumination light reflected by the reflector and received by the image sensor, wherein the image processing circuit is configured to display a positioning-possible area in which the angle of elevation and the horizontal angle of the reflector is detectable by the positioning unit on the display.

13. The surveying apparatus according to claim 10, further comprising:
   an irradiation unit configured to irradiate illumination light from the objective lens toward the reflector; and
   a positioning unit configured to measure an angle of elevation and a horizontal angle of the reflector from the illumination light reflected by the reflector and received by the image sensor, wherein the image processing circuit is configured to display a positioning-possible area in which the angle of elevation and the horizontal angle of the reflector is detectable by the positioning unit on the display.

14. The surveying apparatus according to claim 13, wherein
   the image processing circuit is configured to output command signals for setting the positioning unit to a positioning mode when the reflector is in the positioning-possible area, and
   command signals for setting the ranging unit to a ranging mode when the reflector is in the ranging-possible area.

15. The surveying apparatus according to claim 14, wherein the image processing circuit is configured to display three-dimensional coordinate positions of the reflector on the display when the reflector is in the ranging-possible area.

16. The surveying apparatus according to claim 14, wherein when at least one of the positioning mode and the ranging mode is in operation, the image processing circuit is configured to display on the display a warning indicating that the at least one of the positioning mode and the ranging mode is in operation.

17. The surveying apparatus according to claim 10, wherein the image processing circuit is configured to display the position of the reflector on the display by at least one of blinking, highlighting utilizing color, highlighting utilizing brightness, and use of a character.

18. The surveying apparatus according to claim 10, wherein the image processing circuit is configured to display on the display a direction of movement of an axis of collimation of the collimation optical system unit.

19. The surveying apparatus according to claim 10, wherein the image processing unit is configured to output a sound or voice indicating the position at which the reflector exists.

20. The surveying apparatus according to claim 10, further comprising:
   an irradiation unit configured to irradiate illumination light from the objective lens toward the reflector,
   wherein the image sensor is configured to receive the illumination light reflected by the reflector through the objective lens and configured to output image information including the reflected illumination light, and
   whereinthe image processing circuit is configured to calculate the position of the reflector relative to the collimation optical axis from the image information including the reflected illumination light outputted from the image sensor and display the calculated position of the reflector on the display.

21. The surveying apparatus according to claim 10, further comprising:
   a horizontally rotating member configured to support and rotate the surveying apparatus horizontally; and
   a vertically rotating member configured to support and rotate the surveying apparatus vertically,
   wherein the image processing circuit is configured to display the position of the reflector relative to the collimation optical axis in accordance with change in the collimation optical axis of the collimation optical system unit by rotation of at least one of the horizontally rotating member and the vertically rotating member.

* * * * *